April 17, 1962

E. H. WOOD 3,029,682

APPARATUS FOR DETERMINING PERCENTAGE OXYGEN-SATURATION OF BLOOD

Original Filed Aug. 4, 1949

INVENTOR.
EARL H. WOOD
BY
ATTORNEYS

April 17, 1962 E. H. WOOD 3,029,682
APPARATUS FOR DETERMINING PERCENTAGE
OXYGEN-SATURATION OF BLOOD
Original Filed Aug. 4, 1949 4 Sheets-Sheet 2

INVENTOR.
EARL H. WOOD
BY
ATTORNEYS

April 17, 1962 E. H. WOOD 3,029,682
APPARATUS FOR DETERMINING PERCENTAGE
OXYGEN-SATURATION OF BLOOD
Original Filed Aug. 4, 1949 4 Sheets-Sheet 4

INVENTOR.
EARL H. WOOD
BY
Paul, Moore Hugger
ATTORNEYS

United States Patent Office 3,029,682
Patented Apr. 17, 1962

3,029,682
APPARATUS FOR DETERMINING PERCENTAGE OXYGEN-SATURATION OF BLOOD
Earl H. Wood, Rochester, Minn., assignor, by mesne assignments, to Research Corporation, New York, N.Y., a corporation of New York
Continuation of application Ser. No. 460,030, Oct. 4, 1954, which is a division of application Ser. No. 108,508, Aug. 4, 1949. This application July 17, 1959, Ser. No. 827,973
10 Claims. (Cl. 88—14)

This invention relates to devices for measuring the absolute value of the arterial oxygen saturation in human beings or animals, either in vivo or by measurements taken on whole blood. The instrument is based upon the spectral transmission characteristics of hemoglobin and utilizes novel pick-up units, filtering arrangements and electric circuits.

It has been found that, assuming a constant earpiece light source, the amount of light transmitted through the pinna of the ear and the filters to the photo-electric cells is a function of the fixed characteristics of the respective filters, the amount of ear tissue and the amount and state of oxygenation of the blood in the path of the light.

In prior devices the amount of ear tissue and blood in the optical path are sought to be corrected by adjusting the instrument to a supposedly known value of saturation (usually assumed at 98 to 100 percent when the subject is breathing air or 100 percent oxygen), while the earpiece is in place on the ear on which it is used. Changes in the amount of blood in the optical path are then compensated for electrically by bucking the output of the infra-red cell against the output of the red cell. This method is subject to considerable errors, both from the standpoint of the assumption made and also due to electrical variations in the bucking circuit.

Prior devices have been subject to certain disadvantages. In known oximeters there is a measurement only of changes and not of absolute values of arterial oxygen saturation, since the instrument must be arbitrarily adjusted at the outset of any run to indicate an assumed value of arterial saturation. The device is usually adjusted to indicate an assumedly correct value of saturation, 98% to 100%, when the subject is breathing air or 100% oxygen.

In certain prior devices the oximeter was calibrated against oxygen analyses of capillary blood rendered arterial by histamine iontophoresis of the tissue from which it was obtained, and in respect to such devices there is no data included concerning the variability encountered between chemical and photoelectrically determined values of arterial oxygen saturation. Calibration data for another prior form of oximeter has been collected by several different laboratories and indicates that a range of variability from Van Slyke analyses (chemical analyses) is usually within ±5% toward the higher range of saturation and within ±8% toward the lower end (50%) of the saturation scale. Other data has shown that such other form of oximeter showed a systematic error which +4.7 ±0.4% and that the error for individual earpieces ranged significantly from +2.1 ±0.6% to as much as +13.1 ±1.8% (for ten earpieces tested).

From the foregoing discussion of the accuracy of the oximeter it can be concluded that errors of oximetric measurement may be of several types, (1) errors due to the inherent variability of the method, (2) systematic errors which may be encountered with certain earpieces, and (3) errors inherent in the electrical components, i.e. photoelectric cells and circuits.

The deviation encountered between oximetric and chemical determinations of changes of arterial oxygen saturation when using one form of prior instrument has been demonstrated to be between 4 and 5 percent saturation when the instrument is used on white subjects. This error is inherent in the instrument and method of use and very probably cannot be reduced significantly. The error is considerably increased, however, if the instrument is used on deeply pigmented ears (negroes). There is also evidence that oximetric measurements are considerably more variable in patients who have polycythemia than in normal white subjects. The systematic errors encountered with the prior oximeters may be of considerably greater magnitude than such inherent variability of the device. These errors are due to the characteristics of individual earpieces and may be avoided only by calibration of each earpiece against chemical analyses, by careful selection of earpiece photocells in regard to their spectral sensitivity and electrical characteristics or by both methods.

The chief disadvantages of prior oximeters aside from the inherent variability of the method and the necessity of individual selection or calibration of earpieces are (1) that the device must be set at a known value of arterial oxygen saturation and cannot, therefore, be used to measure absolute values of percentage saturation of arterial blood with oxygen; (2) that for this reason it cannot be conveniently used on persons who may have arterial hypoxemia; and (3) that the device does not function properly on dark-skinned persons.

It is an object of the present invention to overcome these disadvantages and to provide an instrument which may be used to measure the absolute values of arterial oxygen saturation on a continuous basis. It is a further object of the invention to provide an improved oximeter instrument wherein a greater degree of accuracy is provided than heretofore available.

It is another object of the invention to provide a rugged and convenient instrument that can be used by various persons without special training, and, when so used, to provide readings of absolute values of arterial oxygen saturation of a high order of accuracy.

It is another object of the invention to provide an improved oximeter system and circuits.

Other and further objects of the invention are those inherent in the apparatus herein illustrated, described and claimed.

The invention is illustrated with reference to the drawings wherein corresponding numerals refer to the same parts and wherein:

FIGURES 2, 3, 4 and 5 are views of the cuvette photoelectric pick-up, such as is used for photoelectric determination of the oxygen saturation of whole blood.

FIGURE 8 the "saturation" position; and FIGURE 9 the "infra-red" position;

Figures 1, 4:
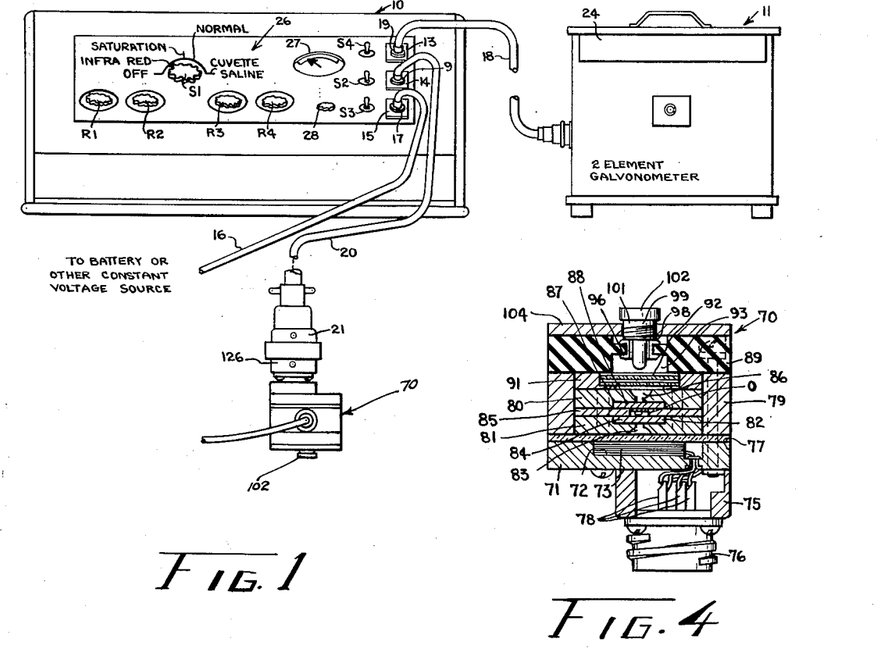
FIGURE 1 is a front elevational view, partly schematic, showing the oximeter control cabinet, the galvanometer cabinet and an oximeter earpiece and circuit connections.
FIGURE 4 is a transverse sectional view, taken along the line and in the direction of arrows 4—4 of FIG- URE 3.
Figure 2:
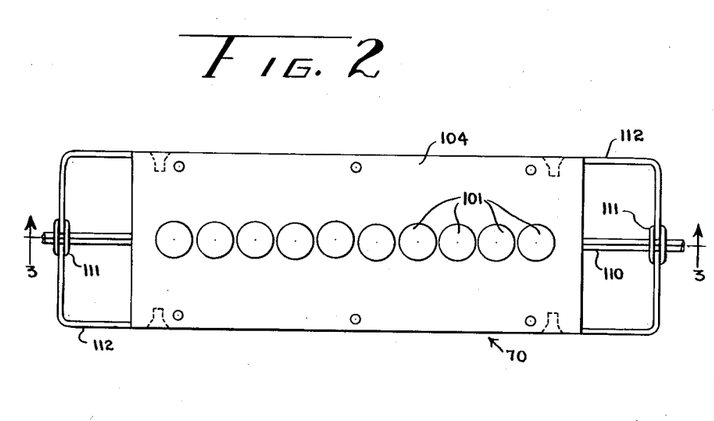
FIGURE 2 shows a top view of the oximeter whole blood photoelectric analysis cell or cuvette.

Referring to the drawings, particularly FIGURE 1, there is illustrated the apparatus of the present invention which includes an oximeter control cabinet generally designated 10, a sensitive two-element galvanometer generally designated 11 and connection leading to a cuvette, generally designated 70. A battery, not illustrated, is used as a source of potential for the instrument, the battery leads being shown at 16. The control cabinet 10 is provided with a plurality of multiple electrical connector jacks at 13, 14 and 15 by means of which the battery (cable 15) and the pick-up unit, which in FIGURE 1 is illustrated cuvette 70, and the galvanometer 11 are connected. Thus, the two-wire battery conductor 16 is connected by means of a suitable plug receptacle 17 to the connection block 15, the galvanometer 11 is connected by a suitable six-wire cable 18 through the plug 19 to the receptacle 13, and the pick-up unit, which in FIGURE 1 is the cuvette 70 is connected through a six-wire cable 20 and plug connection 9 to the socket 14. The cable 20 is provided with a connector 21 by means of which the cuvette 70 may be connected for whole blood analysis hereinafter to be described. Cuvette 70 is shown in FIGURES 7–10. The connectors 21—76 allow for the ready connection to the whole blood analyzing cuvette 70, where desired, without removing cable 20.

The galvanometer unit generally designated 11 is provided with a double light source, not illustrated, within its interior and two sensitive coils which are arranged to indicate on the screen 24 which has scales suitably applied thereto for indicating the deflection of the coils in response to signal currents. Any standard two-element high sensitive galvanometer such as Rubicon box galvanometer may be used.

Figure 10:
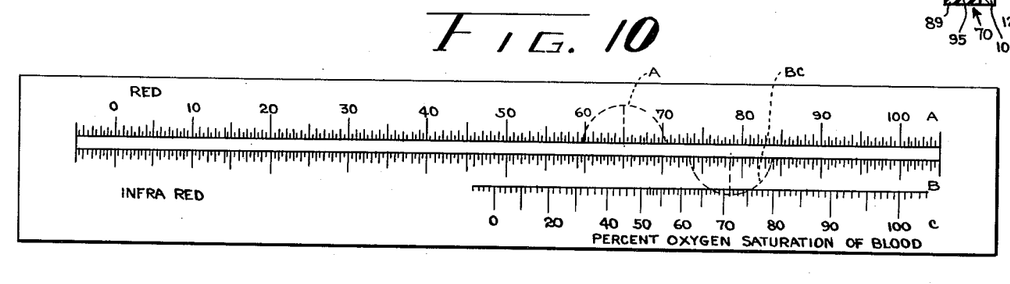
FIGURE 10 is a front elevational view showing the A, B and C scales of the two element galvanometer forming a part of the invention.

FIGURE 10 shows the scales as used in the present invention. As shown there is a scale reading from −5 to 105 having the letters A and B adjacent the right end thereof. The indicator light spot A of the red galvanometer scale (scale A) is a half circle of light with a vertical hairline shadow at the center thereof adjusted so as to read on the A (red cell) scale for double scale operation as hereinafter explained. The indicator light spot BC is likewise a half circle of light having a central vertical hairline shadow which is adjusted so as to read on not only the B (infra-red cell) scale for both double and single scale operation, but also in the C scale, which reads directly the percent oxygen saturation of blood when the instrument is used for single scale operation.

The control panel generally designated 26 of the control cabinet 10 includes a plurality of switches and resistor controls desgniated as follows: A main control multiple gang switch designated S1 is used for setting the controls for any one of five operating conditions which are as follows: Off position; infra-red position (designated "infra-red"); saturation position (designated "saturation"); normal condition (designated "normal"); and a position designated "cuvette-saline." The switch S1 is a gang switch which will be explained in greater detail hereinafter, and is operated by the single control knob designated S1 in FIGURE 1. The control panel also includes a plurality of variable resistor controls designated R1, R2, R3 and R4. The controls R1 and R2 for correspondingly designated resistors are used in single scale (single galvanometer indication) operation wherein the photoelectric cells are arranged in bucking relation to yield a single signal impulse. The controls R3 and R4 for correspondingly designated resistors R3 and R4 are used in the double scale operation wherein the output of the photoelectric cells is read as separate indications. The control cabinet likewise includes a meter 27 by means of which the voltage across or current flowing in the illuminating lamp or lamps of the cuvette 70 may be read with accuracy. The control panel also includes a switch S3 which controls the battery power to the unit and has an "on" and "off" position, a switch S2, which controls the use of the device when the cuvette 70 is used and has two positions, and the switch S4 by means of which the meter 27 may be reconnected for reading either the voltage or the current in the illuminating lamp circuit of the cuvette.

When the device is desired to be used for the analysis of whole blood which is withdrawn from the patient, a cuvette apparatus generally designated 70, shown in FIGURES 2–5 is utilized. The cuvette apparatus includes a housing having a bottom plate 71 of plated brass or other sanitary metal, preferably chromium plated. This plate is provided with a central groove at 72 extending almost from end to end of the container, in which there are situated two barrier layer photoelectric elements 73—73, which are responsive to infra-red light, and a central much smaller barrier layer photoelectric element 74 which is responsive to red light. The electrical connections to the unit are carried out through the sub-housing 75 having a screw type connection at 76 which serves to support the terminals which are grouped together at 78. One connection is provided to each of the barrier layer photoelectric elements and another pair of connectors is provided for the illumination of the apparatus, as will be described.

The barrier layer photoelectric elements 73—73 and 74 are covered by a filter plate at 77 which has two Wrattenfilters No. 88A to cover the infra-red responsive portions of the photocell, namely areas 73—73. This Wratten No. 88A gelatin filter is capable of transmitting light in the range above 720 millimicrons. The red responsive barrier layer cell 74 is covered by a red Wratten 29F filter, which transmits light of wave lengths greater than 600 millimicrons. Other specific filters may be replaced so long as they transmit light of the wave lengths above specified.

Above the filter plate 71 there is provided a wall section at 79 having an open interior in which there is placed a plurality of spaced plates as follows: The plate 81 is at the bottom of this portion of the apparatus and rests on the filter plate 77, the plate 81 being provided with a central groove 82. The plate 81 is of metal and is provided with a light slit at 83 throughout approximately its entire length. In the groove 82 there is placed a slip of glass 84 which is of the same thickness at the depth of the groove 82 and hence presents a flat upper surface when considered with the plate 81. Above the plate 81 are a pair of spacer elements 85—85 of equal thickness and of a width such that when they are positioned as shown in FIGURE 4, they will permit a small space O to exist between them. Above these members 85 is another metal plate 80 which is identical to plate 81. Plate 80 has a slit 86 throughout its entire length along its center line and provided with a space 87 to receive a glass plate 88. When assembled as shown in FIGURE 4, the glass plates 88 and 84, together with the light impervious plates 85—85, present a central longitudinal opening O of uniform thickness from top to bottom and uniform width from side to side, extending entirely throughout the apparatus, it being noted that the wall sections 80 and 81 are provided with apertures at 90—90 in the end walls in alignment with the space thus provided at O. Through the space and holes thus provided a tube 110 of plastic is inserted. Above the plate 86 is a filter frame 91 into which light diffusing and/or filter screens 92 can be fitted and above this is provided an insulating block at 89 which is best observed in FIGURE 3. The insulating block 89 is provided with a recess 93 at its under side and is provided with a plurality of apertures at 94 along its center line immediately over the light slits 83 and 86. The under side of the block 89 is covered in the space 93 with a pair of connection sheets, thus sheet 95 of metal which extends from the right end to the center line and another sheet 96 which extends from the left end approximately to the center line, it being noted that the two sheets 95 and 96 are not connected to each other, being separated by the slits 97. The sheets 95 and 96 are held in place by metal gromlets 98. Above the insulating block 89 there is a metal plate 104 threaded to receive instrument type electric lamps 99.

Figure 3:
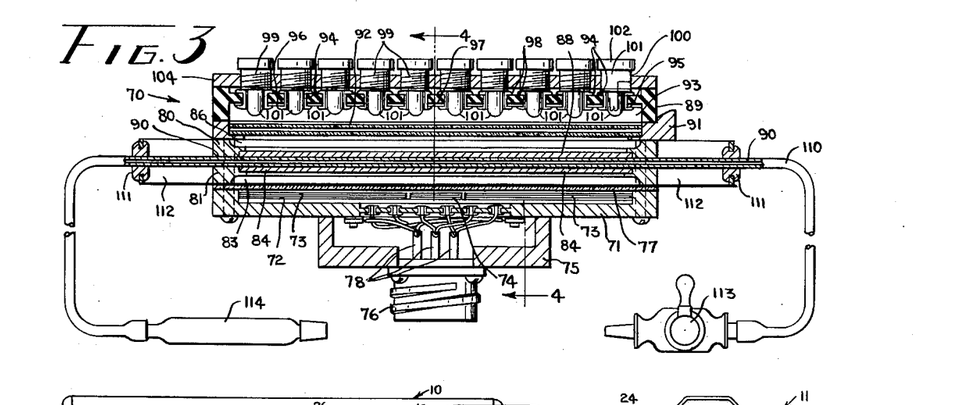
FIGURE 3 is a vertical sectional view, taken along the line and in the direction of arrows 3—3 of FIGURE 2 and showing in addition the tubing connection by means of which the whole blood is withdrawn from and returned to the patient.

Electrical connection is made from one of the terminals 78 of the junction box of the unit to, for example, the plate 95 and from it the circuit extends through the gromlet to the contact area 100 of the lamp 101, whence the circuit continues through the filament of the lamp 101 and to the metal ferrule 102 of the lamp, which is in electrical connection to the plate 85. All of the five lamps to the right of the center line of FIGURE 3 are in parallel and the current flowing through these lamps is collected in the plate 95 and flows across the plate to the left and thence flows in a downward direction through the screw ferrules of the five lamps at the left end of the center line and through the lamps in parallel and thence through the connection plate 96 to another terminal 78 in the connection block. Thus, the lamps are connected in two groups in series, the lamps in each group in parallel with each other. In this way a plurality of small instrument lamps can easily be wired for simultaneous illumination and any one of them can be removed for examination or replacement.

It may be noted that the filter frame 91 is mounted so as to slide endways to the right, as shown in FIGURE 3, so as to permit the filter unit 92 to be withdrawn for change and replacement as desired. The filter units 92 are used to standardize, adjust and check the response of the instrument and are removed from the filter frame 91 during determination on blood. In the space O previously described, there is situated a polythene tube 110 which is supported at the end by gromlets 111—111 held in the brackets 112—112 supported from the housing. The tube 110 is connected to the sanitary stop cock 113 at one end and to a hypodermic needle connection 114 at the opposite end. When the tube 110 is positioned within the instrument it is compressed slightly between the glass plates 88—84, and the side plates 85—85, so that it presents a cross section of thin, flat, somewhat rectangular shape, as shown in FIGURE 4. The tube is thus held to a uniform dimension from top to bottom and the whole blood or other fluid within the tube is thus exposed through the slits 83 and 86 uniformly for a given distance within the instrument.

Figure 5:
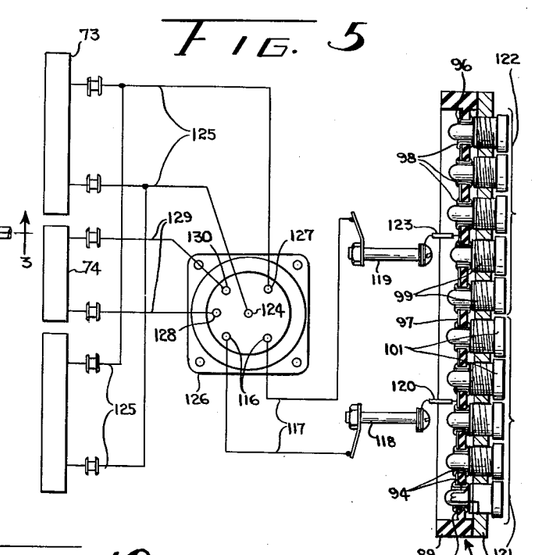
FIGURE 5 is a wiring diagram of the device shown in FIGURES 2 through 7 showing the connections from the photoelectric cells and from the light sources to the plug connector of the cuvette unit.

The electrical connections to the instrument are shown in FIGURE 5 wherein the terminals 116 of the plug connection are connected through the wires 117 to the studs 118 and 119. The electrical connections from the stud 118 is by means of the wire 120 to the connection plate 95 previously described, thence through the lamps 101 shown under bracket 121, in parallel, to the plate 104 and thence through the lamps 101 shown under bracket 122, in parallel, to the connection plate 96 and by wire 123 to stud 119. The terminals 124 and 127 are connected by a pair of conductors 125 to the positive and negative terminals of the infra-red responsive photocells 73—73. Similarly, the positive and negative terminals of the red light responsive barrier layer photocell 74 are connected by a pair of conductors 129 to terminals 128 and 130. The plug connection 126 may conveniently be connected to the connection terminal 21, of FIGURE 1 when it is desired to connect the cuvette 70.

Figure 6:
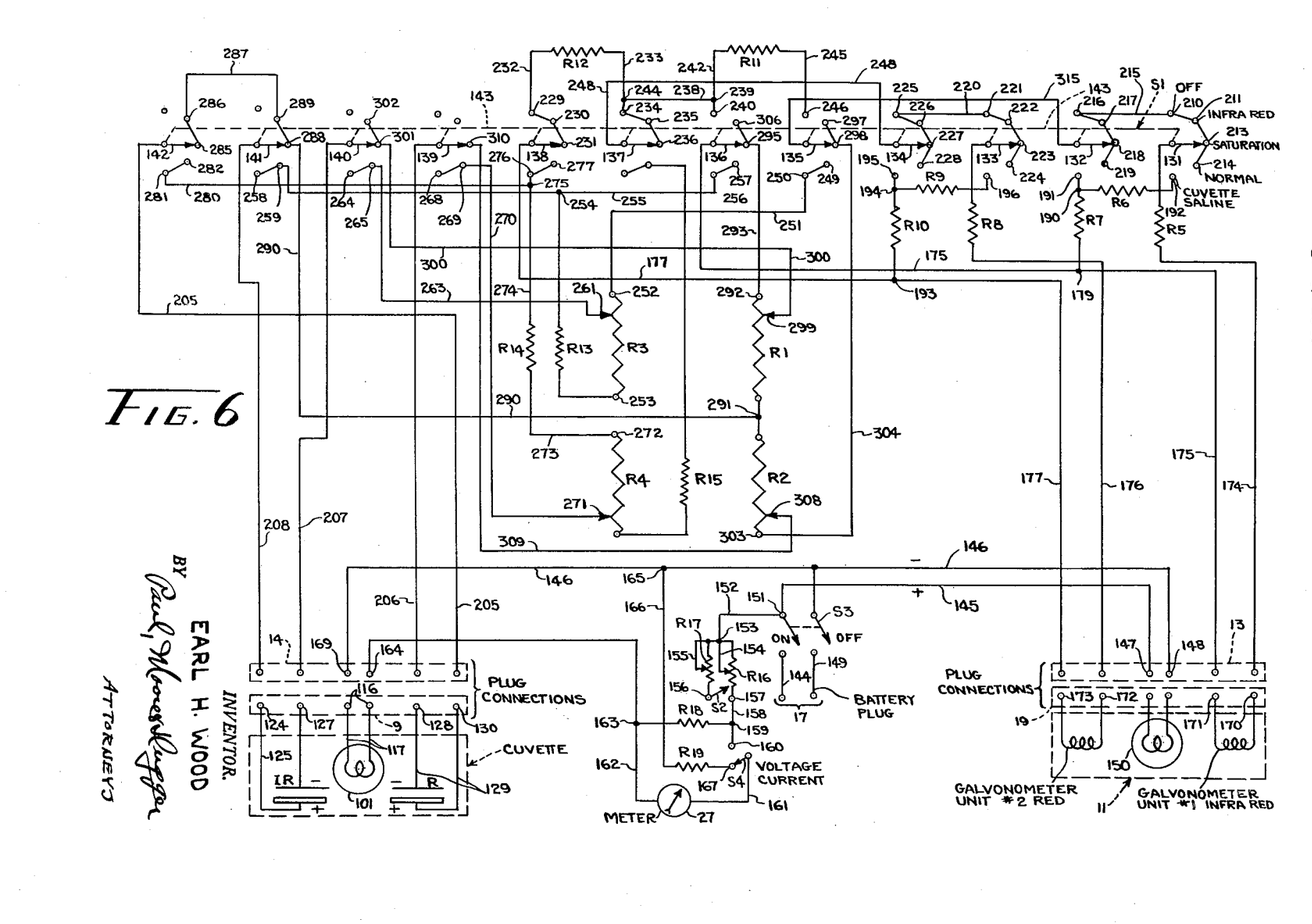
FIGURE 6 is a wiring diagram of the entire instrument illustrating the wiring and circuit components of the control cabinet, the wiring and circuit components of the cuvette and the wiring and circuit connections of the galvanometer unit.

Referring to FIGURE 6 there is illustrated a wiring diagram of the control cabinet and the cuvette 70, and of the galvanometer 11. The upper portion of the wiring diagram, FIGURE 6, and the central lower portion are all contained in the control cabinet, the cuvette 70 being connected to the control cabinet by means of the plug connection 9 into the socket 14 and the galvanometer being connected by means of the plug 19 into the socket 13. The battery leads are connected to the socket 17.

In the control cabinet the switch generally designated S1 is a gang switch having twelve switch arms designated 131–142 inclusive. The switch arms are operated simultaneously by a common mechanical operating shaft 143 and each switch arm is arranged so that it operates over and contacts with five contacts selectively, which are designated "off," "infra-red," "saturation," "normal" and "cuvette-saline." It will be understood that when the switch S1 is moved to any of the positions above designated, for switch 131, the contact arms of the remaining switches 132–142 will be at corresponding angular positions. Thus, in FIGURE 6 the switch S1 is shown at the "saturation" position and all of the contacts 131–142, inclusive, are shown in the horizontal position in FIGURE 6 in contact with the middle one of the five arcuately arranged contacts of each switch.

From the battery plug 17 switch leads 149 and 144 are connected through the on-off battery control switch S3 and thence continue as battery positive lead 145 and battery negative lead 146 within the interior of the control cabinet. The leads 145 and 146 are connected directly to terminals 147 and 148 of the galvanometer receptacle 13 and when the galvanometer plug 19 is plugged into the receptacle 13, contact is established to lamp 150 of the galvanometer. From terminal 151 on switch S3 a circuit continues via line 152 to junction 153 of a resistor control network, including potentiometer resistors R16 and R17. The resistor R16 has a variable shunt 154 and resistor R17 has a variable shunt 155, the opposite terminals of these resistors being connected to the two terminals 156 and 157 of the switch S2. From terminal 157 line 158 continues through junction 159 to terminal 160 of the voltage-current control switch S4, which determines whether the meter 27 reads "voltage" or "current." The blade of switch S4 is connected by line 161 to one terminal of the meter 27 and the opposite terminal of the meter is connected by line 162 which extends through junction 163 to the terminal 164 on the receptacle 14 of the control cabinet, into which the earpiece or cuvette connection cable 20 is adapted to be connected by means of the multiple prong plug 9. From negative battery supply lead junction 165 a circuit extends through line 166 to one terminal of resistor R19, the opposite terminal of which is connected to terminal 167 of the switch S4. Resistor R18 is connected from junction 163 on line 162 to junction 159 on line 158. The negative battery supply line 146 on the interior of the control cabinet is also connected to terminal 169 on the receptacle 14. When the plug 9 cuvette 70 is inserted into the receptacle 14, a circuit is established from terminals 164 and 169 to the plurality of lamps 122 of the cuvette, the lamps in the cuvette being designated 101.

The purpose of switch S4 and resistors R18 and R19 is to permit the use of the meter 27 either for the measurement of current flowing through the lamp or lamps of the cuvette, or alternatively to measure the voltage which is applied across the terminals 164 and 169 serving the lamp or lamps. Since it is the current flowing through the lamp or lamps which is determinative of the brilliance of illumination, the current measurement is most readily relied upon, this measurement being taken by moving the switch S4 to contact 160, at which time the meter measures the voltage drop across resistor R18. However, in many installations, where a cable 20–22 of constant length is being used from day to day, a voltage measurement is equally convenient, this being taken by moving the switch S4 to the terminal 167, in which event the meter 27 measures the voltage from terminal 163 to 165, through the resistor R19.

The resistors R16 and R17, switch S2 and the variable shunts 154 and 155 are used for controlling the current through the lamps. The variable shunts 154 and 155 are preferably ganged together and are controlled by the knob 28 on the face of the control panel of the control cabinet 10. By closing teh switch S2 and increasing the shunted portion of resistors R16 and R17, the current flowing to the lamps 101, may be increased. By turning the knob 28 so as to reduce the shunted portion of resistors R16 and R17, the current may be decreased and by opening the switch S2 the current may be decreased even further.

The coil of galvanometer No. 1 is connected through cord 18 to terminals 170 and 171 of the plug connector 19, while the coil of galvanometer No. 2 is similarly connected to the terminals 172 and 173 of the plug 19, it being understood that both galvanometer coils are in the same instrument and read on the same scale. When the plug 19 is inserted into the receptacle 13, connection is made by terminals 170 and 171 to lines 174 and 175, respectively, of the control cabinet, while terminals 172 and 173 from the coil of galvanometer unit No. 2 are connected to lines 176 and 177.

Line 174 extends through resistor R5 to the blade element of switch 131. Line 175 extends through junction 179 and thence through resistor R7 to junction 190 which is connected to terminal 191 of switch 132. From junction 190 a circuit extends through a resistor R6 to contact 192 of switch 131. From junction 179 line 175 extends also to the movable contact of switch 136.

Line 176 from the coil of galvanometer No. 2 extends through resistor R8 to the movable contact of switch 133. Line 177 from the coil of galvanometer No. 2 extends through junction 193 from which a circuit extends through resistor R10 to junction 194 and to contact 195 of switch 134. From junction 194 a circuit extends through resistor R9 to contact 196 of switch 133. From junction 193 line 177 also extends to the movable contact of switch 138.

Referring to the cuvette plug and socket connection 9—14 it will be noted that the negative terminal of the red light responsive photocell unit R is connected by one of the lines 129 to terminal 128 and that the positive terminal of the red light responsive photocell R is connected by the other line 129 to terminal 130. Similarly, from the negative infra-red light responsive photocell IR a circuit extends through line 125 to terminal 127 and from the positive terminal of the same photocell a circuit extends through the other line 125 to the terminal 124. When the plug connection 9 is inserted in the socket 14, the terminals 128, 130, 127 and 124 establish contact with, respectively, lines 206, 205, 207 and 208, and the lamps 101 are connected to terminals 164 and 169. Line 205 extends to the movable contact of switch 142, whereas line 208 extends to the movable contact of switch 141. Line 206 extends to the movable contact 139 and line 207 to the movable contact of switch 140.

Contacts 210, 211, 213 and 214 of switch 131, which are, respectively, the off, infra-red, saturation and normal switch positions are connected together and are connected through line 215 to the similarly connected together contacts 216, 217, 218 and 219 of switch 132. Similarly, the off, infra-red, saturation and normal contacts of switches 133 and 134 are all connected together by means of line 220, these contacts being designated 221–224, inclusive, for switch 133 and 225–228, inclusive, for switch 134. The off, infra-red and saturation contacts of switch 138 designated, respectively, contacts 229–231 are connected together by line 232 extending through resistor R12 and thence through line 233 to junction 244 whence line 233 extends to the off contact 234, the infra-red contact 235 and saturation contact 236 of switch 137. From junction 244 line 233 extends to junction 239 and thence to the off contact 240 of switch 136. From junction 239 a line 242 extends through resistor R11 to line 245 and thence to the off contact 246 of switch 135. From the movable contact of switch 137 a line 248 extends to the movable contact of switch 134. The normal contact 249 of switch 135 and the cuvette-saline contact 250 of the same switch are connected together and are connected through line 251 to terminal 252 of resistor R3 and thence through the resistor to terminal 253 which is connected through resistor R13 to junction 254, whence the circuit extends though line 255 to the cuvette saline contact 256 and the normal contact 257 of switch 136. Line 255 also extends from junction 254 to the corresponding cuvette-saline contact 258 and normal contact 259 of switch 141. From the sliding contact 261 on resistor R3 line 263 extends to the cuvette saline contact 264 and the normal contact 265 of switch 140. The cuvette-saline contact 268 and normal contact 269 of switch 139 are connected through line 270 to the variable contact 271 of resistor R4, which has its terminal 272 connected through line 273 to resistor R14 and thence through line 274 to junction 275 and to the cuvette-saline contact 276 and the normal contact 277 of switch 138. From junction 275 a branch 280 extends to the cuvette-saline contact 281 and the normal contact 282 of switch 142. The saturation contact 285 and the infra-red contact 286 of switch 142 are connected through line 287 to the saturation contact 288 and infra-red contact 289 of switch 141, from which line 290 extends to junction 291 between resistors R1 and R2. The terminal 292 of resistor R1 is connected via line 293 to saturation contact 295 and infra-red contact 306 of switch 136. From the movable contact 299 on resistor R1 line 300 extends to the saturation contact 301 and infra-red contact 302 of switch 140. From junction 291 a circuit extends through resistor R2 to terminal 303 which is connected via line 304 to the saturation contact 298 and the infra-red contact 297 of switch 135. From the movable contact 308 on resistor R2 the circuit extends via line 309 to the saturation contact 310 of switch 139. It may be noted that the off contacts of switches 140–142, inclusive, have no circuits connected to them and that the off and infra-red contacts of switch 139 likewise have no circuits connected to them.

*Operation*

When the instrument is out of service the battery switch S3 is turned to the off position, thus de-energizing the lamp 150 of the galvanometers and the lamps 101 of the cuvette. At the same time switch S1 is turned to the off position. In this position a circuit may be traced from the coil of galvanometer No. 1 through terminal 170, line 174, resistor R5, movable contact of switch 131, contact 210 of switch 131, line 215, contact point 216 of switch 131 and through the movable contact of that switch, thence via line 315 to the movable contact of switch 135 and through contact 246, line 245, resistor R11 to contact 240 of switch 136, thence through the movable contact of that switch and through line 175 to the opposite terminal of the coil of galvanometer 1. In this way galvanometer 1 is connected across a total resistance, namely resistances R5 plus R11 in series, which is equal to the critical damping resistance of the galvanometer. The galvanometer thus in the off position is kept in its most serviceable condition. Similarly, when the switch S1 is in the off position, the coil of galvanometer unit 2 is connected across resistors R8 and R12 in series, which likewise equal the critical damping resistance of the coil of galvanometer 2.

To put the instrument in operation switch S3 is turned to the "on" position. This turns on the lights 101 in the cuvette. The switch S2 is set for the cuvette. This switch S2 varies the amount of control obtained by resistors R16 and R17. The switch S4 can be set to either the voltage position, in which the voltmeter measures the voltage across the lamps of the cuvette or to the current measurement position in which it measures the current through the lamps. It is assumed that the galvanometer cuvette and battery connections are established. The spotlight on the galvanometer should now be illuminated and the mechanical zero of the two galvanometers should be adjusted to zero with the switch S1 in the "off" position. In this position the switch S1 connects resistors across the galvanometer terminals such that the galvanometer has optimal damping characteristics.

Figure 7:
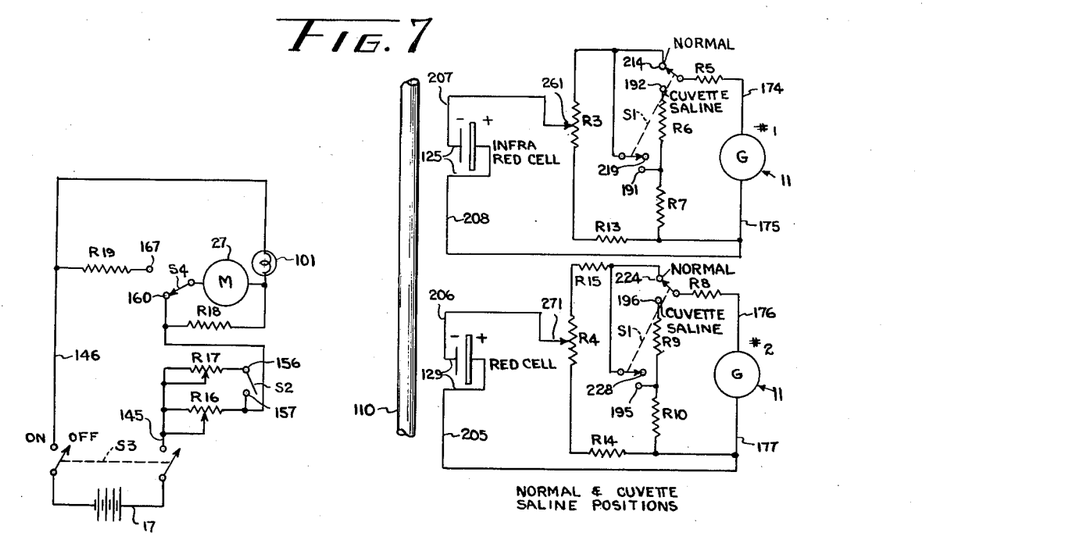
FIGURES 7, 8 and 9 are, respectively, simplified wiring diagrams illustrating the circuits when the switches shown in FIGURE 6 are set in certain positions for operation of the unit, FIGURE 7 illustrating the "normal" and "cuvette saline" positions.

*Cuvette operation, switch S1 in cuvette-saline position.*—Switch S2 is adjusted to the "cuvette-saline" position, in which case the simplified wiring diagram is as shown in FIGURE 7 with the switch S1 in the cuvette-saline position therein. Resistors R16 and R17 will also have to be adjusted to appropriate values. The patient is made ready and hypodermic needle, a cardiac catheter or other device is inserted in the patient for drawing the blood sample, the cuvette is placed between the needle and the hypodermic syringe with appropriate connections so that saline solution can be flushed through the cuvette. With the cuvette full of saline solution and switch S1 adjusted to "cuvette-saline" position, adjust controls R3 and R4 until the infra-red and red spots, respectively, indicate 100 on the galvanometer. The designation $R_O$ is given to the "red reading" of galvanometer No 2. The designation $IR_O$ is given to the "infra-red reading" of galvanometer No. 1. The hypodermic syringe, not shown, which is connected to tube 114 is then manipulated so as to withdraw the saline solution from the tube 110 of the cuvette and to draw blood from the patient into and through the tube 110 of the cuvette. The switch S1 is adjusted to the normal position when blood enters the cuvette. The blood sample withdrawn into the syringe may be accumulated for later chemical or other analysis or re-injected into the patient. The readings on the galvanometers are then taken. The reading of galvanometer 1 is designated $IR_N$, and the reading of galvanometer 2 is $R_N$. The readings are then taken with the blood in tube 110. In the cuvette-saline position of switch S1, the sensitivity of the galvanometers 1 and 2 is reduced to one-fourth as much as they are in the "normal" position due to the resistors inserted in series with them in the cuvette-saline position. Accordingly, the $R_O$ and $IR_O$ readings, which were taken in the cuvette-saline position are both multiplied by four and the values so obtained are used with those obtained in the normal position, viz. the $IR_N$ and $R_N$ readings, for calculating the percentage oxygen saturation of whole blood in accordance with the following procedure:

A value which is a function of the absorption of infra-red light by the blood ($IR_B$) can be obtained by the following equation:

$$IR_B = \log IR_O - \log IR_N = \log \frac{IR_O}{IR_N}$$

in which $IR_O$ is the galvanometer deflection produced by the infra-red cell when the tube 110 is filed with saline solution and $IR_N$ is the galvanometer deflection produced by the infra-red cell when the tube 110 contains blood.

Similarly, a value ($R_B$) which is a function of the absorption of red light by the blood interposed in the optical path of the cuvette can be obtained by the expression $$R_B = \log \frac{R_O}{R_N}$$

in which $R_O$ is the galvanometer deflection produced by the red cell when the tube is filled with saline and $R_N$ is the galvanometer deflection obtained when tube 110 contains blood.

The light absorption by blood in the near infra-red is a function of the total amount of hemoglobin contained in this blood. Likewise, the absorption of red light is a function of the amount of oxyhemoglobin and total hemoglobin contained in this blood. Therefore, the ratio $R_B/IR_B$ is a function of the oxygen and saturation of the blood interposed in the optical path of the cuvette. The expression $R_B/IR_B$ gives a value which is a function of the percentage saturation of arterial blood with oxygen.

Galvanometer readings may, if desired, also be taken with blood stationary in tube 110 of the cuvette 70 for a period of 30 seconds or more and the oxygen saturation of the blood determined in accordance with the foregoing procedure.

The filter slide 92 is provided for purposes of checking the instrument and several filter media are provided in several slides 92. One filter media is such that its spectral transmission characteristics are approximately the same as for arterial blood of 100% oxygen saturation and another slide includes a filter having spectral transmission characteristics equal to arterial blood of, for example, 20% oxygen saturation. These filters, after having been constructed and calibrated against actual blood analyses and readings corresponding to them, may thereafter be used for purposes of quickly checking the instrument by inserting first one filter and then another into the cuvette and adjusting the instrument accordingly.

*Single scale operation—switch S1 in the "saturation" or "infra-red" position.*—In accordance with the present invention the identical instrument may be utilized for making direct determination of the percentage oxygen saturation of arterial blood as drawn through the cuvette apparatus of the invention. For such determinations the instrument is used in accordance with the following method:

(1) The switch S3 is moved to the "on" position and switch S2 is adjusted to the "cuvette saline" position. The light source rheostat, viz. R16—R17, is then adjusted to the correct amperage and the voltage and amperage through the lights is then checked.

(2) A filter designated the T-90 filter which has approximately the same spectral transmission characteristics as that of a normal ear containing blood of 90% oxygen saturation is inserted in slide 91. Thus adjusted the switch S1 is moved to the infra-red position and the apparatus is permitted to warm up for at least five minutes.

(3) The control switch S1 is then adjusted to the "off" position and the zero position on the infra-red indicating galvanometer, viz. galvanometer unit 1 is mechanically adjusted so that the indication spot of the galvanometer comes to rest at a predetermined "zero position" on the scale determined for cuvette 70 by chemical analysis or comparison with known standards. This adjustment is made by means of the usual mechanical adjustment of the galvanometer (not illustrated) by which the galvanometer coil is mechanically changed in position so as to permit the galvanometer indicator spot to come to rest at any position with no current flowing. For example, the galvanometer may be adjusted for a particular cuvette so as to "zero" at the 96 on the "B" scale.

(4) The foregoing preliminaries having been accomplished, the instrument is then checked against a series of filters as follows:

(a) The filter T-90 being in place in cuvette 70 and the tube 110 filled with saline solution the switch S1 is adjusted to the "IR" position and the infra-red potentiometer resistor R1 is regulated so that galvanometer 1 reads at a predetermined "infra-red setting" on the B scale (for each cuvette), for example 22 on the B scale, as determined by chemical analysis or comparison with known standards.

Figure 9:
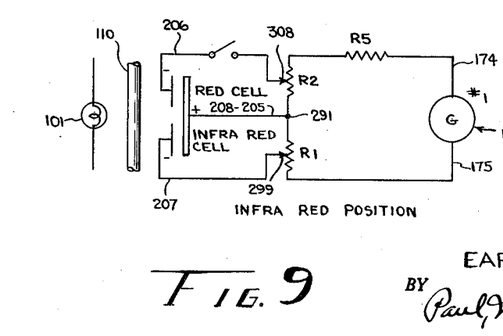

A simplified diagram of the circuit of the instrument in the "infra-red" position is shown in FIGURE 9, in which it will be noted that the red cell is open circuited in respect to its resistor R2, whereas the infra-red is connected across a portion of its resistor R1. Hence, in this position the infra-red cell alone provides the potential deflecting galvanometer No. 1.

Figure 8:
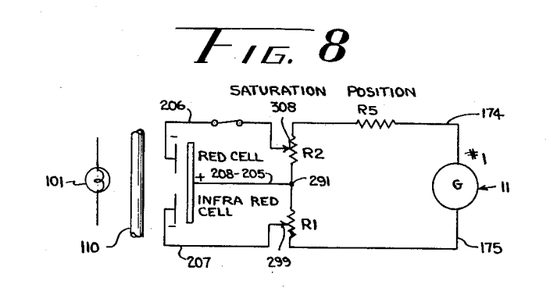

(b) The switch S1 is then adjusted to the "saturation" position, the schematic diagram of the circuits of which is shown in FIGURE 8. In this position the red cell and the infra-red cell are connected across the resistors R1 and R2 which are in potentiometer series arrangement in respect to galvanometer No. 1 and hence the potential of both cells controls the galvanometer deflection, the red cell being in bucking relation to the infra-red cell. In this position the red cell potential deflects the galvanometer reading which was at, for example, 22, up to the previously established "zero" position at 96.

(c) The T-90 filter is then removed, leaving only the saline solution filled tube 110 in the light path. The red potentiometer resistor R2 is re-adjusted so as to bring the galvanometer reading to the originally predetermined "zero position," which was, for example, 96 on the B scale of galvanometer 1.

(d) The third scale is also provided for galvanometer 1 known as the "C" scale, as shown in FIGURE 10, and has been previously calibrated by reference to chemical or other analyses or comparison with known standards so as to read directly in percent oxygen saturation. With the T-90 filter again in place in slide 91 and switch S1 in the "saturation" position, as previously defined, galvanometer 1 should at this time read approximately 90% on the "C" scale, which is the percent oxygen saturation represented by the T-90 filter.

(e) A T-20 filter, which has approximately the same spectral transmission characteristics of reduced blood of about 20% oxygen saturation, is then placed in slide 91 and a reading is taken on the C scale which should indicate such percentage. Any number of intermediate percentage points may be established to calibrate the C scale of percent oxygen saturation.

In the following procedure the same adjustments as above described are made:

(5) After a warm-up period, the switch S1 is adjusted to the "IR" position and the infra-red potentiometer resistor R1 is adjusted so that the reading of galvanometer 1 is at the predetermined "infra-red setting," which was, for example, 22 on the B scale of that galvanometer. The galvanometer reading with the control switch S1 in the off position should remain at the predetermined "zero position," which was, for example, 96 on the B scale of galvanometer 1, all adjustments having been properly made.

(6) The switch S1 is then adjusted to the "saturation" position and with a saline solution in tube 110 the red potentiometer resistor R2 is adjusted so that the galvanometer comes to rest at the "zero position" on the B scale of galvanometer 1. The hypodermic syringe, not shown, which is connected to tube 114 is then manipulated so as to withdraw the saline solution from the tube 110 of the cuvette and to draw blood from the patient into and through the tube 110 of the cuvette.

(7) The galvanometer reading is now taken and indicates the percent oxygen saturation of blood directly on the C scale of galvanometer 1.

(8) The galvanometer reading with switch S1 adjusted to the IR position should be recorded at intervals. If this value changes appreciably adjustments described in paragraphs 5 and 6 should be repeated. The reading taken in the "IR position" is almost independent of the oxygen saturation of the blood and is proportional to the total blood and tissue in the optical path.

Where single scale operation is carried out using the cuvette, the infra-red setting of paragraph 5 is made with blood in the tube 110 of cuvette 70 stationary for a period of 30 seconds, switch S1 in the IR position. The "zero position" setting of paragraph 6 is then made with the tube 110 filled with saline solution and the switch S1 in the saturation position.

This application is a continuation of my application Serial No. 460,030, filed October 4, 1954, now abandoned which was a division of my application Serial No. 108,508, filed August 4, 1949, now Patent No. 2,706,927.

As many apparently widely different embodiments of this invention may be made without departing from the spirit and scope thereof, it is to be understood that I do not limit myself to the specific embodiments herein.

I claim:

1. An apparatus for the spectrographic determining of percentage of oxygen saturation of blood comprising a tube of light transmitting plastic adapted to receive a flowing sample of blood, means mounting said tube providing a slit opening in opaque means extending along said tube for the transmission of a narrow band of light transversely therethrough, at least two photo-responsive cells responsive respectively to red light and infra-red light, a light protecting housing mounting said photo-responsive cells linearly along said slit opening and in a position to receive light transmitted transversely through said tube, and means for directing light transversely through said slit opening and said tube upon said photo-responsive cells.

2. An apparatus for the spectrographic determining of percentage oxygen saturation of blood comprising a tube of light transmitting plastic, said tube being constructed so as to be connectable to a patient for withdrawing a blood supply and connecting to said patient for returning said blood supply, means for supporting said tube comprising plates of opaque material spaced edge-to-edge so as to form a narrow slit in which said tube is disposed, light transmitting covering plates positioned so as to cover the bottom and top of said slit for confining the tube in said slit between said opaque plates, means for illuminating one face of said transmitting covering plates and said tube positioned in the slit between said opaque plates, and at least two photo-responsive cells responsive respectively to red light and infra-red light mounted on a light protected housing linearly along the slit and in a position to receive light transmitted transversely through the slit and the tube in said slit.

3. The apparatus of claim 2 further characterized in that the covering plates are laid in contact with and against the opaque plates and with them form said slit space into one of generally rectangular cross-section along which the plastic tube is confined and snugly held.

4. The apparatus of claim 2 further characterized in that the opaque plates together form a wall which is oriented as a dividing plane longitudinally along a box, in which said means for illuminating is provided on one side of said dividing plane and said photo-responsive cells are positioned on the other side of said dividing plane.

5. The apparatus of claim 4 further characterized in that said means for illuminating comprises a plurality of small light bulbs arranged linearly in one wall of said box and parallel to said slit.

6. The apparatus of claim 5 further characterized in that said light bulbs are fastened through apertures in said box so as to project inwardly but are accessible from the exterior thereof for individual replacement.

7. The apparatus of claim 2 further characterized in that said photo-responsive means is covered with a filter.

8. The apparatus of claim 2 further characterized in that a light filter is positioned between said means for illuminating and said slit.

9. The apparatus of claim 8 further characterized in that said light filter is mounted on a slidable frame which is in turn mounted for sliding movement between said means for illuminating and said opaque plates.

10. The apparatus of claim 2 further characterized in that supplementary opaque light barriers are provided between said means for illuminating and said opaque plates and between said opaque plates and said photo-responsive means, each of said barriers being provided with a slot therethrough which parallels the slit between said opaque plates and converges outwardly in width therefrom.

References Cited in the file of this patent

UNITED STATES PATENTS

| | | |
|---|---|---|
| 2,358,992 | Millikan | Sept. 26, 1944 |
| 2,455,810 | Ryan | Dec. 7, 1948 |